United States Patent
Jiao et al.

(10) Patent No.: US 10,663,784 B2
(45) Date of Patent: May 26, 2020

(54) LIQUID CRYSTAL DISPLAY DEVICE AND DISPLAY

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Yu-Ming Jiao, Shenzhen (CN); Cheng-Fa Chung, New Taipei (TW)

(73) Assignees: HONG FU JIN PRECISION INDUSTRY (ShenZhen) CO., LTD., Shenzhen (CN); HONHAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/168,740

(22) Filed: Oct. 23, 2018

(65) Prior Publication Data
US 2019/0391441 A1 Dec. 26, 2019

(30) Foreign Application Priority Data
Jun. 26, 2018 (CN) .......................... 2018 1 0670653

(51) Int. Cl.
*G02F 1/1333* (2006.01)
*G02F 1/1335* (2006.01)
*F21V 8/00* (2006.01)

(52) U.S. Cl.
CPC ...... *G02F 1/133308* (2013.01); *G02B 6/0031* (2013.01); *G02F 1/133553* (2013.01); *G02F 2001/13332* (2013.01); *G02F 2001/133314* (2013.01)

(58) Field of Classification Search
CPC ......... G02F 1/133308; G02F 1/133553; G02F 2001/133314; G02F 2001/13332; G02F 1/133608; G02F 2001/133311; G02F 2001/133317; G02F 2001/133322; G02F 2001/133325; G02F 2001/133328;
(Continued)

(56) References Cited

U.S. PATENT DOCUMENTS

2005/0105011 A1* 5/2005 An .................... G02F 1/133308
349/58
2012/0092585 A1* 4/2012 Byeon .................. H05K 7/1438
349/58

(Continued)

FOREIGN PATENT DOCUMENTS

CN 206671725 U 11/2017

*Primary Examiner* — Shan Liu
(74) *Attorney, Agent, or Firm* — ScienBiziP, P.C.

(57) ABSTRACT

A liquid crystal display device of reduced thickness includes a back plate comprising a first back plate portion, two second back plate portion, two third back plate portions, and a liquid crystal glass. The two second back plate portions are connected at opposite ends of the first back plate portion. The two second back plate portions are equally inclined to the first back plate portion. The third back plate portions are at ends of the two second back plate portions, and are opposite to the first back plate portion. Both two third back plate portions are double-folded. The liquid crystal glass is fixed on the two third back plate portions, and is spaced from the first back plate portion.

10 Claims, 2 Drawing Sheets

(58) Field of Classification Search
CPC ........ G02F 2001/133331; G02F 2001/133334; G02B 6/0031
USPC .................................................... 349/58–60
See application file for complete search history.

(56) References Cited

U.S. PATENT DOCUMENTS

| | | | |
|---|---|---|---|
| 2012/0242925 A1* | 9/2012 | Watanabe | G02F 1/133308 349/58 |
| 2014/0192290 A1* | 7/2014 | Mori | G02F 1/133308 349/58 |
| 2016/0330838 A1* | 11/2016 | Park | H05K 1/142 |
| 2016/0349427 A1* | 12/2016 | Lin | G02B 6/0088 |
| 2017/0038523 A1* | 2/2017 | Ochi | G02F 1/133528 |
| 2017/0123144 A1* | 5/2017 | Baek | G02B 6/005 |

* cited by examiner

LIQUID CRYSTAL DISPLAY DEVICE AND DISPLAY

FIELD

The subject matter relates to a field of liquid crystal displays, especially relates to a liquid crystal display device and a display.

BACKGROUND

A liquid crystal display device generally includes a back plate, a middle frame, and a liquid crystal glass. The middle frame is positioned between the back plate and the liquid crystal glass for supporting the liquid crystal glass. However, a design of the middle frame increases the thickness of the liquid crystal display device.

Therefore, there is room for improvement in the art.

BRIEF DESCRIPTION OF THE DRAWINGS

Implementations of the present disclosure will now be described, by way of example only, with reference to the attached figures, wherein.

DETAILED DESCRIPTION

Figure 1:
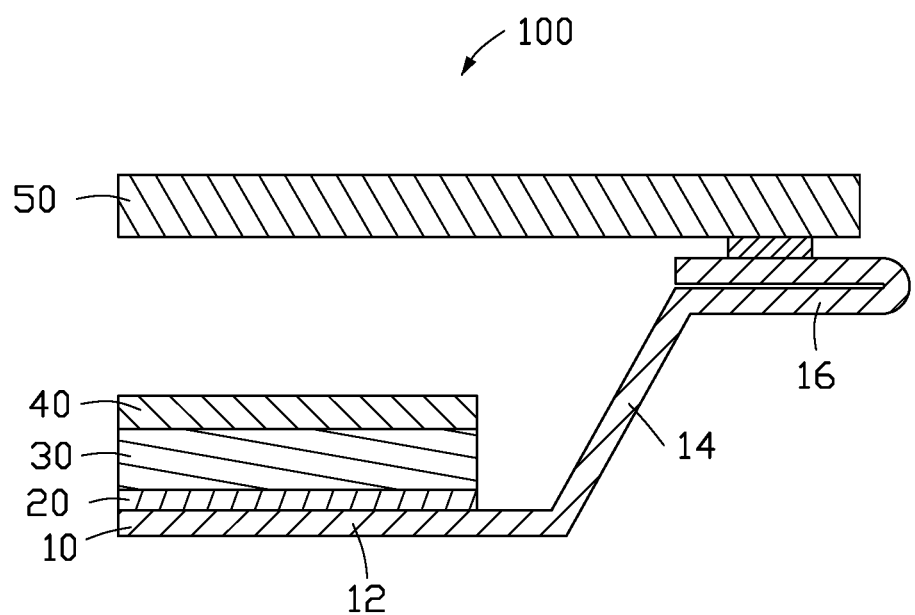
FIG. 1 is a sectional diagram of part of a liquid crystal display device of a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure. The term "substantially" is defined to be essentially conforming to the particular dimension, shape, or other feature that the term modifies, such that the component need not be exact. For example, "substantially rectangular" means that the object resembles a rectangle, but can have one or more deviations from a true rectangle.

The term "comprising," when utilized, means "including, but not necessarily limited to"; it specifically indicates open-ended inclusion or membership in the so-described combination, assembly, series, and the like.

FIG. 1 shows a liquid crystal display device 100 includes a back plate 10, a reflective sheet 20, a light guide plate 30, a diaphragm 40, and a liquid crystal glass 50. The reflective sheet 20, the light guide plate 30, the diaphragm 40, and the liquid crystal glass 50 are positioned on the back plate 10.

The back plate 10 is made of an electrogalvanized steel sheet, an electroplated lithium zinc steel sheet, a lithium steel sheet, or a steel sheet.

The back plate 10 includes a first back plate portion 12, two second back plate portions 14, and two third back plate portions 16. The first back plate portion 12 is a flat plate. The second back plate portions 14 are at opposite ends of the first back plate portion 12 and are oblique to the first back plate portion 12. The two second back plate portions 14 are inclined at a same angle to the first back plate portion 12, both are inclined outward with respect to the central position of the first back plate portion 12. The two third back plate portions 16 are at one end of each of the two second back plate portions 14 and are positioned opposite to the first back plate portion 12. The two third back plate portions 16 are double-folded. The two third back plate portions 16 are parallel to the first back plate portion 12.

The third back plate portion 16 is made by a stamping process. Specifically, the third back plate portion 16 is formed by the ends of the back plate 10 being folded in two. The third back plate portion 16 may be formed by downward bending and flattening or by upward bending and flattening. The third back plate portion 16 is formed by bending upward and flattening.

It should be noted that the third back plate portion 16 can also be fabricated by other manufacturing processes. For example, the back plate 10 can be extruded by molding to form an initial double-folded structure. The structure is not limited to the embodiment of the present invention.

The reflective sheet 20 is attached to the first back plate portion 12. In the embodiment, the thickness of the reflective sheet 20 is less than the thickness of the first back plate portion 12.

The light guide plate 30 is attached to the reflective sheet 20 and positioned away from the first back plate portion 12. The thickness of the light guide plate 30 is greater than the thickness of the first back plate portion 12.

The diaphragm 40 is attached to the light guide plate 30. The diaphragm 40 is positioned away from the first back plate portion 12. The thickness of the diaphragm 40 is greater than the thickness of the first back plate portion 12 and less than the thickness of the light guide plate 30.

The liquid crystal glass 50 is fixed to the third back plate portion 16 and spaced from the first back plate portion 12. The liquid crystal glass 50 is parallel to the first back plate portion 12. The liquid crystal glass 50 is glued to the third back plate portion 16.

When assembling, the back plate 10 is formed into a first back plate portion 12, two second back plate portions 14, and two third back plate portions 16 by stamping. The two second back plate portions 14 are at opposite ends of the first back plate portion 12 and are oblique to the first back plate portion 12. The two third back plate portions 16 are at the ends of the two second back plate portions 14 and are positioned opposite to the first back plate portion 12. The third back plate portion 16 is bent upward and flattened. The reflective sheet 20, the light guide plate 30, and the diaphragm 40 are attached to the first back plate portion 12 one by one. Finally, the liquid crystal glass 50 is adhered to the two third back plate portions 16. At this time, the liquid crystal glass and the first back plate portion 12 are parallel to each other. The installation of the liquid crystal display device 100 is thereby completed.

Figure 2:
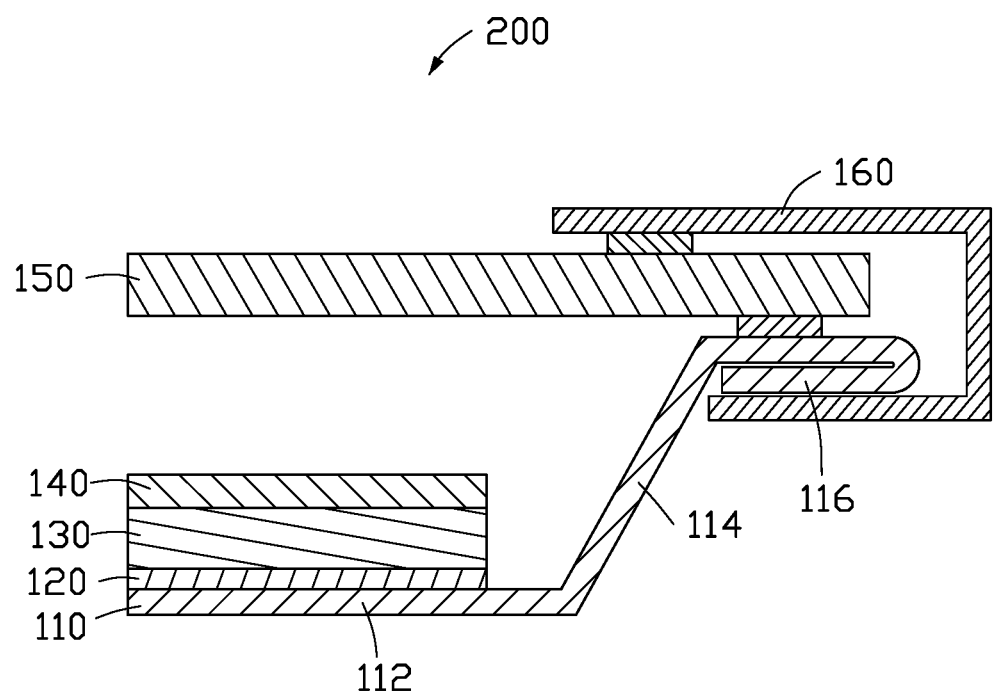
FIG. 2 is a sectional diagram of part of a liquid crystal display device of a second embodiment.

FIG. 2 shows a liquid crystal display device 200 according to a second embodiment is shown. The liquid crystal display device 200 of the second embodiment is different from the liquid crystal display device 100 of the first embodiment. The liquid crystal display device includes a back plate 110, a reflective sheet 120, and a light guide plate 130, a diaphragm 140, a liquid crystal glass 150, and a front frame 160. The reflective sheet 120, the light guide plate 130, the diaphragm 140, and the liquid crystal glass 150 are positioned on the back plate 110. The back plate 110 includes two third back plate portions 116. The third back plate portion 116 is fabricated by bending downward and flattening. The front frame 160 covers and is fixed to ends of the third back plate portion 116 and the liquid crystal glass 150 for supporting and fixing the shape of the liquid crystal display device 200.

The embodiment of the present invention further provides a display structure or entity (not shown) which includes the liquid crystal display devices 100 and 200.

The liquid crystal display devices 100 and 200 are manufactured to form the two back portions 10 and 110 by stamping or by other method. The two third back plate portions 16 and 116 are double-folded, the liquid crystal glass is directly adhesively fixed on the two third back plate portions 16 and 116. A middle frame of the liquid crystal display device 100, 200 is omitted, thereby reducing a thickness of the liquid crystal display device 100 and 200. A number of steps of a manufacturing process of the liquid crystal display device 100, 200 is reduced, and labor costs and material manufacturing costs likewise.

The embodiments shown and described above are only examples. Many details are often found in such art. Therefore, many such details are neither shown nor described. Even though numerous characteristics and advantages of the present disclosure have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A liquid crystal display device comprising:
a back plate comprising a first back plate portion, two second back plate portions and two third back plate portions, the two second back plate portions connected to opposite ends of the first back plate portion, the two third back plate portions respectively positioned to ends of the two second back plate portions, and opposite to the first back plate portion, both the two third back plate portions double-folded,
wherein each of the two second back plate portions has a straight bar shape and is inclined upward and outward with respect to a central position of the first back plate portion, the two second back plate portions are inclined at a same angle to the first back plate portion, the two third back plate portions are extended outward from ends of the two second back plate portions,
a liquid crystal glass fixed on the two third back plate portions, and spaced from the first back plate portion;
a reflective sheet,
a light guide plate, and
a diaphragm, wherein the reflective sheet is attached to the first back plate portion, the light guide plate is attached to the reflective sheet, and the light guide plate is away from the first back plate portion, the diaphragm is attached to the light guide plate, and the diaphragm is positioned away from the first back plate portion and spaced from the liquid crystal glass and the two third back plate portions,
wherein the two third back plate portions are formed by flattening two ends of the back plate, and each of the two third back plate portions is U-shaped and formed by downward bending and flattening the respective end of the back plate, and each flat portion of the two third back plate portions is parallel to the first back plate portion.

2. The liquid crystal display device of claim 1, wherein the liquid crystal glass is parallel to the first back plate portion, and fixed to the two third back plate portions by gluing.

3. The liquid crystal display device of claim 1, further comprising a front frame, wherein the front frame covers and is fixed to ends of the liquid crystal glass.

4. The liquid crystal display device of claim 1, wherein the back plate is made of an electrogalvanized steel sheet, an electroplated lithium zinc steel sheet, a lithium steel sheet, or a steel sheet.

5. The liquid crystal display device of claim 1, wherein the back plate is formed by stamping.

6. A display comprising:
a liquid crystal display device comprising:
a back plate comprising a first back plate portion, two second back plate portions and two third back plate portions, the two second back plate portions connected to two opposite ends of the first back plate portion, the two third back plate portions respectively positioned to ends of the two second back plate portions, and opposite to the first back plate portion, both the two third back plate portions double-folded,
wherein each of the two second back plate portions has a straight bar shape and is inclined upward and outward with respect to a central position of the first back plate portion, the two second back plate portions are inclined at a same angle to the first back plate portion, the two third back plate portions are extended outward from ends of the two second back plate portions;
a liquid crystal glass fixed on the two third back plate portions, and spaced from the first back plate portion;
a reflective sheet,
a light guide plate; and
a diaphragm, wherein the reflective sheet is attached to the first back plate portion, and the light guide plate is attached to the reflective sheet, and is away from the first back plate portion, the diaphragm is attached to the light guide plate, and the diaphragm is positioned away from the first back plate portion and is spaced from the liquid crystal glass and the two third back plate portions,
wherein the two third back plate portions are formed by flattening two ends of the back plate, and each of the two third back plate portions is U-shaped and formed by downward bending and flattening the respective end of the back plate, and each flat portion of the two third back plate portions is parallel to the first back plate portion.

7. The display of claim 6, wherein the liquid crystal glass is parallel to the first back plate portion, and fixed to the two third back plate portions by gluing.

8. The display of claim 6, further comprising a front frame, wherein the front frame covers and is fixed to ends of the liquid crystal glass.

9. The display of claim 6, wherein the material of the back plate is made of an electrogalvanized steel sheet, an electroplated lithium zinc steel sheet, a lithium steel sheet, or a steel sheet.

10. The display of claim 6, wherein the back plate is formed by stamping.

* * * * *